United States Patent
Wu et al.

(10) Patent No.: US 8,176,548 B2
(45) Date of Patent: May 8, 2012

(54) PROTECTION SYSTEM FOR DISPLAY APPARATUS AND METHOD THEREOF

(75) Inventors: Chao-Wang Wu, Hsinchu (TW); Lien-Fu Cheng, Hsinchu (TW)

(73) Assignee: Coretronic Corporation, Hsin-Chu (TW)

( * ) Notice: Subject to any disclaimer, the term of this patent is extended or adjusted under 35 U.S.C. 154(b) by 975 days.

(21) Appl. No.: 11/834,025

(22) Filed: Aug. 6, 2007

(65) Prior Publication Data

US 2008/0104717 A1 May 1, 2008

(30) Foreign Application Priority Data

Oct. 27, 2006 (TW) .................................. 95139742 A

(51) Int. Cl.
*G06F 21/00* (2006.01)

(52) U.S. Cl. ......... 726/20; 726/4; 726/7; 726/9; 726/17; 726/19; 726/21; 726/26; 726/27; 726/30; 713/168; 713/182; 713/184; 713/185; 713/186; 340/5.1; 340/5.2; 340/5.3; 340/5.31; 340/5.65; 340/5.66; 340/5.7; 340/5.71; 340/5.72; 340/5.73; 340/5.8; 340/5.81; 340/5.82; 340/5.85

(58) Field of Classification Search .............. 726/2–21, 726/34–36, 26–30; 340/5.1–5.86; 70/275–286; 713/168–172, 182–186
See application file for complete search history.

(56) References Cited

U.S. PATENT DOCUMENTS

| | | | | |
|---|---|---|---|---|
| 4,475,164 A | * | 10/1984 | Sado | .............................. 708/109 |
| 4,534,194 A | * | 8/1985 | Aydin | ........................... 70/278.2 |
| 5,533,126 A | | 7/1996 | Hazard | |
| 6,331,812 B1 | * | 12/2001 | Dawalibi | ....................... 340/5.2 |
| 6,600,406 B1 | * | 7/2003 | Ha | ............................... 340/5.2 |
| 6,618,807 B1 | | 9/2003 | Wang et al. | |
| 7,012,503 B2 | * | 3/2006 | Nielsen | ........................... 340/5.6 |
| 2002/0030586 A1 | * | 3/2002 | Katou et al. | ................. 340/5.72 |

FOREIGN PATENT DOCUMENTS

| TW | 419636 | 1/2001 |
|---|---|---|
| TW | 420796 | 2/2001 |
| TW | 543849 | 7/2003 |
| TW | 571019 | 1/2004 |
| TW | 200413921 | 8/2004 |

OTHER PUBLICATIONS

The smartcard as a mobile security device by Scheuermann; Publisher: Electronic and Communications Journal; Date: Oct. 2002.*
"Office Action of Taiwan Counterpart Application" issued on May 31, 2010, p. 1-p. 6, in which the listed references were cited.
"Office Action of Taiwan counterpart application with English translation", issued on May 20, 2011, p. 1-p. 8.

* cited by examiner

*Primary Examiner* — Taghi Arani
*Assistant Examiner* — Madhuri Herzog
(74) *Attorney, Agent, or Firm* — Jianq Chyun IP Office

(57) ABSTRACT

A protection system for a display apparatus and a method thereof are provided. The protection system includes an electronic key and a protection module. The protection system performs security identification with a plurality of passwords and updates the passwords every time after the security identification is completed to improve the security of the display apparatus. The display apparatus is allowed to be turned on when one of the passwords is correct, and the passwords are separately updated after the security identification is completed. The protection system is highly secure and provides greater convenience to users.

6 Claims, 5 Drawing Sheets

PROTECTION SYSTEM FOR DISPLAY APPARATUS AND METHOD THEREOF

CROSS-REFERENCE TO RELATED APPLICATION

This application claims the priority benefit of Taiwan application serial no. 95139742, filed Oct. 27, 2006. All disclosure of the Taiwan application is incorporated herein by reference.

BACKGROUND OF THE INVENTION

1. Field of the Invention

The present invention relates to an electronic protection system. More particularly, the present invention relates to a protection system for a display apparatus and a method thereof.

2. Description of Related Art

The guard and data security of display apparatuses at present can be categorized into hardware protection and software protection. The most popular hardware protection is by using a mechanical lock along with a metal key. However, the metal key is easily copied or stolen, and the display apparatus can be unlocked and used once the key is copied or stolen.

The most commonly used software protection is to protect data through encryption/decryption programs, for example, a screen-saver program. However, the password used by a user is usually short since it is easy to memorize and convenient to use, so that it is easily cracked. Besides, there is also a protection method using an electronic lock corresponding to an electronic key for protecting a display apparatus. However, if the electronic key makes use of fixed passwords, the electronic key may be easily pirated or cracked. If the electronic key makes use of microprocessor to perform encryption/decryption on the passwords, its cost will be too high. In addition, since there is usually only one electronic key, it is inconvenient for one to do one's job if the electronic key is lost.

SUMMARY OF THE INVENTION

Accordingly, one object of the present invention is directed to provide a protection system for a display apparatus, wherein a plurality of passwords of at least an electronic key are updated every time after a security identification is completed, in case an electronic key is pirated.

A second object of the present invention is to provide a protection system for a display apparatus, wherein two electronic keys have independent passwords to enhance the usage conveniences for users.

A third object of the present invention is to provide a method for protecting a display apparatus, wherein whether the display apparatus is allowed to be turned on or not is determined by comparing a plurality of passwords of an electronic key with a plurality of identification codes of the display apparatus, and the passwords and identification codes are separately updated every time after a security identification is completed to provide high security to the display apparatus.

To achieve the aforementioned and other objectives, the present invention provides a protection system for a display apparatus. The protection system includes an electronic key and a protection module disposed in the display apparatus. The electronic key is used for storing a plurality of first passwords, and the protection module has a plurality of first identification codes corresponding to the first passwords in the electronic key. When the electronic key is connected to the display apparatus, the protection module separately compares the first passwords with the first identification codes. If one of the first passwords tallies with one of the first identification codes, the display apparatus is allowed to be turned on, otherwise the display apparatus is prohibited from being turned on.

According to one preferred embodiment of the present invention, if one of the first passwords tallies with one of the first identification codes, the protection module updates the first passwords and the first identification codes separately, and the updated first passwords correspond to the updated first identification codes.

According to one preferred embodiment of the present invention, the protection system includes a spare electronic key for storing a plurality of second passwords, and the protection module includes a plurality of second identification codes corresponding to the second passwords. When the spare electronic key is connected to the display apparatus, the protection module separately compares the second passwords with the second identification codes. If one of the second passwords tallies with one of the second identification codes, the display apparatus is allowed to be turned on and the protection module separately updates the second passwords and the second identification codes.

The present invention further provides a method for protecting a display apparatus. The method includes following steps. First, whether an electronic key is connected to the display apparatus is determined. When the electronic key is connected to the display apparatus, a plurality of first passwords in the electronic key and a plurality of first identification codes in the display apparatus are read and compared. If one of the first passwords tallies with one of the first identification codes, the display apparatus is allowed to be turned on, otherwise the display apparatus is prohibited from being turned on.

According to one preferred embodiment of the present invention, when comparing the first passwords with the first identification codes, if one of the first passwords tallies with one of the first identification codes, the first passwords and the first identification codes are separately updated, and the updated first passwords correspond to the updated first identification codes.

According to one preferred embodiment of the present invention, whether the spare electronic key is connected to the display apparatus is determined, and when the spare electronic key is connected to the display apparatus, a plurality of second passwords in the spare electronic key and a plurality of second identification codes in the display apparatus are read and compared. If one of the second passwords tallies with one of the second identification codes, the display apparatus is allowed to be turned on.

In summary, according to the present invention, passwords are updated every time, in case the electronic key is pirated. The passwords become invalid after every security identification procedure, thus, any pirated electronic key becomes invalid after the original electronic key is used. A user can judge whether the electronic key has been pirated by determining whether the original electronic key is invalid or not. Password identification and comparison are performed by separately updating and comparing the passwords in the electronic key, so that the electronic key can still be used even when some password data in the electronic key has been damaged. Moreover, according to another embodiment of the present invention, a spare electronic key is used and two electronic keys respectively have two independent passwords, therefore the usage conveniences for user is enhanced and delay in work schedule is avoided.

Other objectives, features and advantages of the present invention will be further understood from the further technology features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
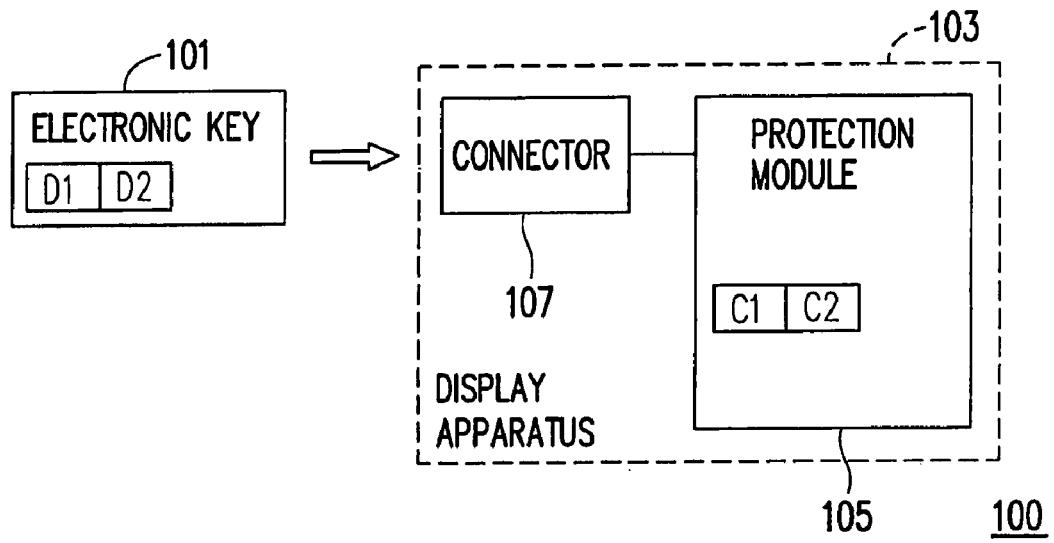
FIG. 1 is a schematic block diagram of a protection system for a display apparatus according to a first embodiment of the present invention.

FIG. 1 is a schematic block diagram of a protection system for a display apparatus according to a first embodiment of the present invention. The protection system 100 includes an electronic key 101, a protection module 105, and a connector 107. The protection module 105 and the connector 107 are disposed in a display apparatus 103, and the connector 107 is used for connecting the electronic key 101. The electronic key 101 communicates with the protection module 105 via the connector 107. The transmission interface of the connector 107 may be a video graphics array (VGA) interface, a RS232 interface, a digital visual interface (DVI), a universal series bus (USB) interface, or a high-definition multimedia interface (HDMI) and so on. The protection module 105 and the electronic key 101 may also transmit data to each other through a wireless transmission interface. However, the data transmission pattern between the electronic key 101 and the protection module 105 is not limited in the present invention.

The electronic key 101 has a memory for storing a plurality of first passwords D1 and D2. The protection module 105 has a memory and a microprocessor. The memory of the protection module 105 is used for storing a plurality of first identification codes C1 and C2. The first identification codes C1 and C2 are corresponding to the first passwords D1 and D2. The memories of the electronic key 101 and the protection module 105 are, for example, erasable programmable read only memories (EPROM), and the memory of the protection module 105 may also be the memory disposed in the display apparatus 103. The operation function of the microprocessor in the protection module 105 may be implemented by the microprocessor for processing image display in the display apparatus 103, so that there is no need to dispose a microprocessor additionally and the design cost is reduced accordingly. Moreover, in the present embodiment, the display apparatus may also be a projector or any other similar display apparatus, and the operation of password identification of the protection module may be implemented by the microprocessor in the projector, such as a DDP2000.

When the protection system 100 is enabled, the protection module 105 detects whether the electronic key 101 is connected to the display apparatus 103. When the electronic key 101 is connected to the display apparatus 103 via the connector 107, the microprocessor in the protection module 105 compares the first passwords D1 and D2 with the first identification codes C1 and C2 one by one. If one of the first passwords D1 and D2 tallies with one of the first identification codes C1 and C2, the display apparatus 103 is allowed to be turned on, otherwise the display apparatus 103 is prohibited from being turned on.

When the comparison has been completed and the display apparatus 103 is allowed to be turned on, the microprocessor in the protection module 105 automatically updates the first passwords D1, D2 and the first identification codes C1, C2 separately (the passwords D1, D2 and the first identification codes C1, C2 are updated one by one), and the updated first passwords D1 and D2 are corresponding to the updated the first identification codes C1 and C2. After the passwords and the identification codes are compared and updated, the electronic key 101 is removed, in case the display apparatus 103 and the electronic key 101 are stolen together.

By automatically updating the first passwords D1, D2 and the first identification codes C1, C2 every time after they are used, security is increased and the passwords are prevented from being cracked or copied. The generation of new passwords varies with the time factor, the password principle, and the products, thus, every time different apparatuses generate different new passwords to be used in next security identification. Since the passwords of an electronic key change along each usage, even when the electronic key is copied, the copied electronic key becomes invalid after the original electronic key generates new passwords. Contrarily, the original electronic key becomes invalid if the copied electronic key is used first, so that the keeper of the electronic key is alerted that the electronic key may be pirated, and then enhances security protection.

The main purpose of separately updating the passwords and the identification codes is that if the electronic key is removed accidentally or a power failure occurs while the system is reading or updating the passwords, only one of the passwords in the electronic key is damaged but the other passwords are unaffected. Thus, the electronic key can still be used for security identification. Certainly, the foregoing description is also suitable for the comparison between a plurality of passwords and a plurality of identification codes, and the implementation thereof should be understood by those having ordinary skill in the art according to the present disclosure, therefore will not be described herein.

Figure 2:
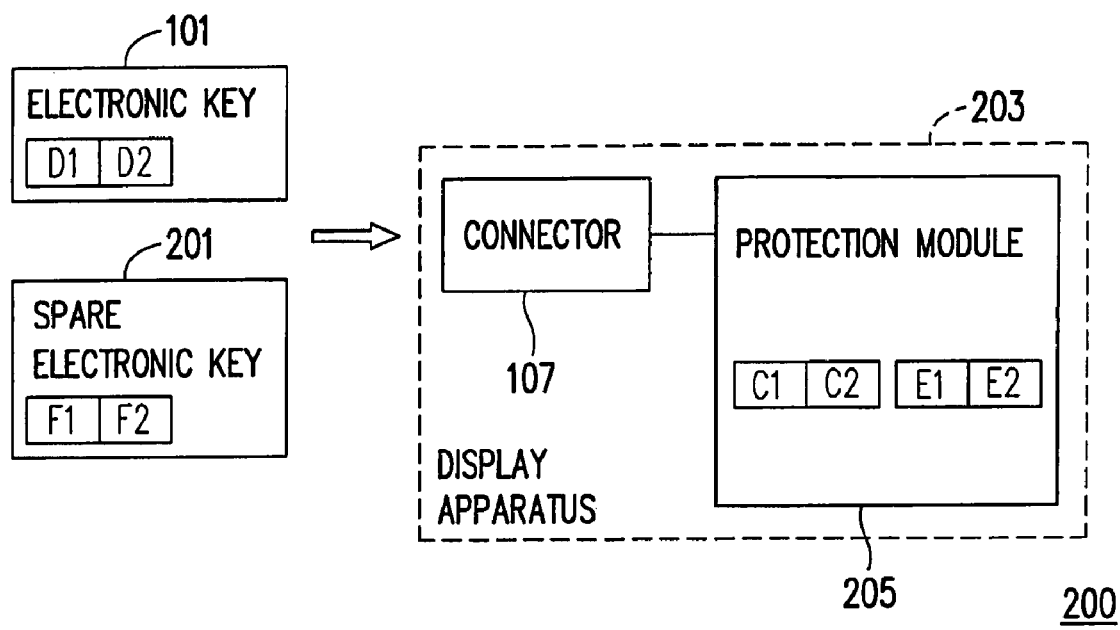
FIG. 2 is a schematic block diagram of a protection system for a display apparatus according to a second embodiment of the present invention.

Referring to FIG. 2, comparing to the protection system 100 in the first embodiment, a protection system 200 according to a second embodiment of the present invention further includes a spare electronic key 201. The passwords stored in the electronic key 101 and the passwords stored in the spare electronic key 201 are independent and won't affect each other. A user may turn on the display apparatus 203 with the electronic key 101 or the spare electronic key 201. Since there are two electronic keys (including the spare electronic key), the display apparatus 203 can still be turned on even though one of the two electronic keys is lost, so that delay in work schedule is prevented.

The spare electronic key 201 has a memory for storing a plurality of second passwords; in the present embodiment, two second passwords F1 and F2 are used as example. The memory of the protection module 205 stores the first identification codes C1 and C2 and the second identification codes E1 and E2 respectively corresponding to the electronic key 101 and the spare electronic key 201. When the electronic key 101 or the spare electronic key 201 is connected to the display apparatus 203, the protection module 205 determines whether to allow or not allow the display apparatus 203 to be turned on according to the corresponding identification codes. The electronic key 101 or the spare electronic key 201 is removed from the display apparatus 203 after the comparison step, in case the display apparatus 203 and the electronic key used are stolen together.

When the protection module 205 starts the protection function for the display apparatus 203 is determined by user. It may be set that the electronic key (the electronic key 101 or the spare electronic key 201) is re-identified only when the power supply (for example, an external AC supply) is re-plugged. Or, it may be set that the electronic key is re-identified every time when the display apparatus 203 is turned on (for example, the "POWER ON" switch on the display apparatus 203 is pressed), and such a method is suitable for a display apparatus using battery. Or, it may also be set that the electronic key has to be re-identified if the display apparatus has not been used for a predetermined time, just like a screen-saver program.

Figure 3:
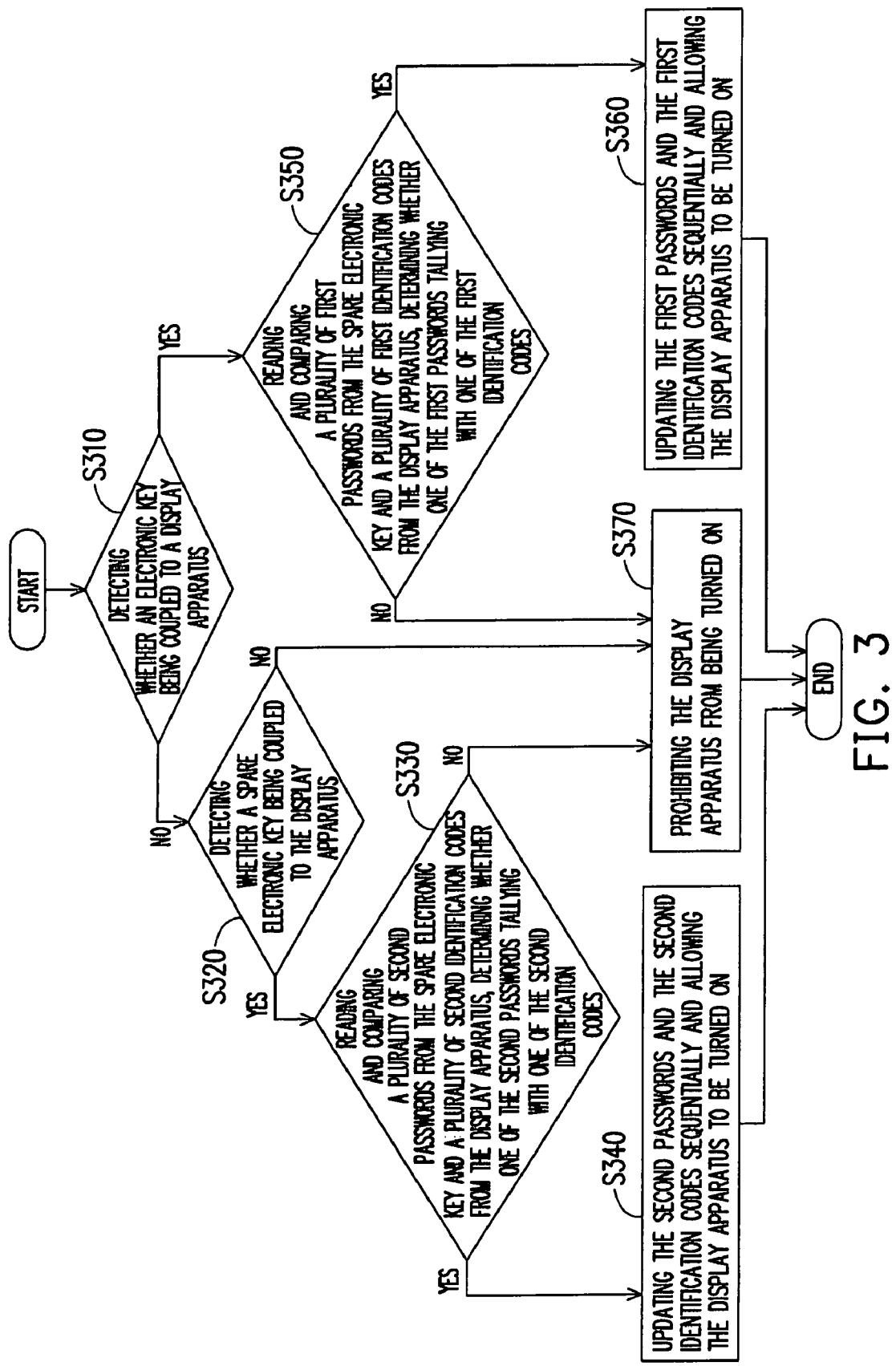
FIG. 3 is a flowchart illustrating a method for protecting a display apparatus according to the second embodiment of the present invention.

Next, a method for protecting a display apparatus provided by the present invention will be described with reference to FIG. 3 and FIG. 2. First, in step S310, whether or not the electronic key 101 is connected to the display apparatus 203 is determined. If it is determined that the electronic key 101 is connected to the display apparatus 203, step S350 is executed to read a plurality of first passwords D1 and D2 in the electronic key 101 and determines whether one of the first passwords D1 and D2 tallies with one of the first identification codes C1 and C2 in the display apparatus 203, if so, step S360 is executed to separately update the first passwords D1, D2 and the first identification codes C1, C2 and to allow the display apparatus 203 to be turned on. If none of the first passwords tallies with one of the first identification codes, step S370 is executed to prohibit the display apparatus 203 from being turned on.

In step S310, if the electronic key 101 is not connected to the display apparatus 203, step S320 is executed. In the step 320, whether the spare electronic key 201 is connected to the display apparatus 203 is determined. If the spare electronic key 201 is not connected to the display apparatus 203, step S370 is executed to prohibit the display apparatus 203 from being turned on, otherwise step S330 is executed to read a plurality of second passwords F1 and F2 from the spare electronic key and compare the second passwords F1 and F2 with the second identification codes E1 and E2 in the display apparatus 203, and whether one of the second passwords F1 and F2 tallies with one of the second identification codes E1 and E2 is determined. If one of the second passwords F1 and F2 tallies with one of the second identification codes E1 and E2, the second passwords F1, F2 and the second identification codes E1, E2 are updated and the display apparatus 203 is allowed to be turned on (step S340), otherwise the display apparatus 203 is prohibited from being turned on (step S370). The other operation details of the method for protecting display apparatus in the present embodiment has been explained in the descriptions of FIG. 1 and FIG. 2 therefore will not be described herein.

Figure 4:
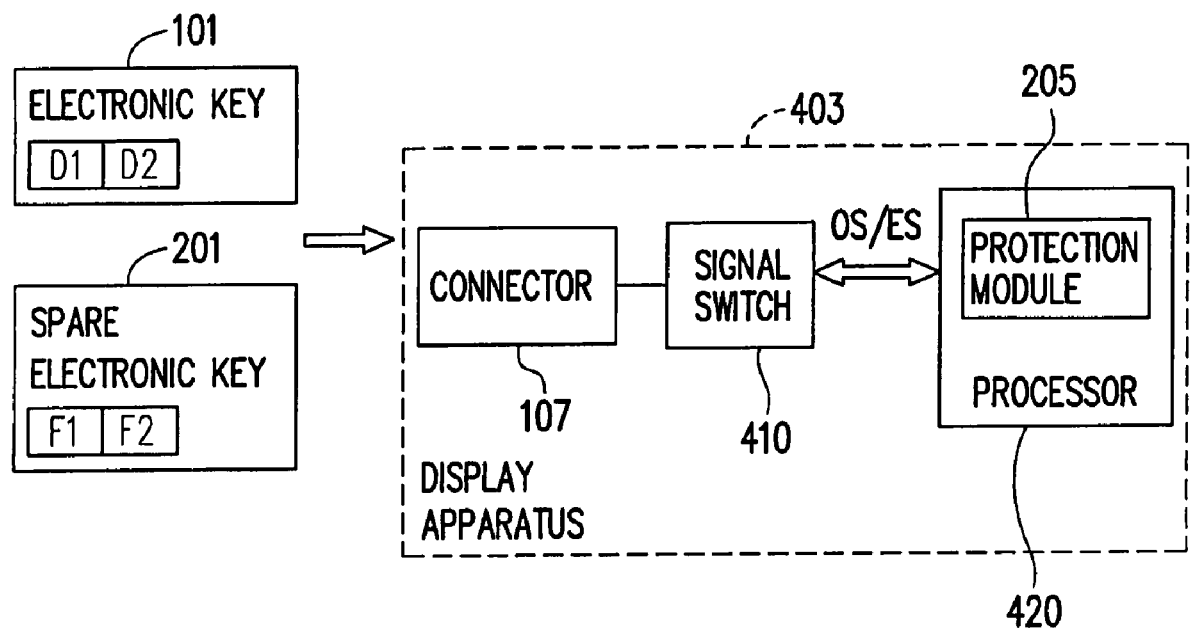
FIG. 4 is a schematic block diagram of a protection system for a display apparatus according to a third embodiment of the present invention.
Figure 5:
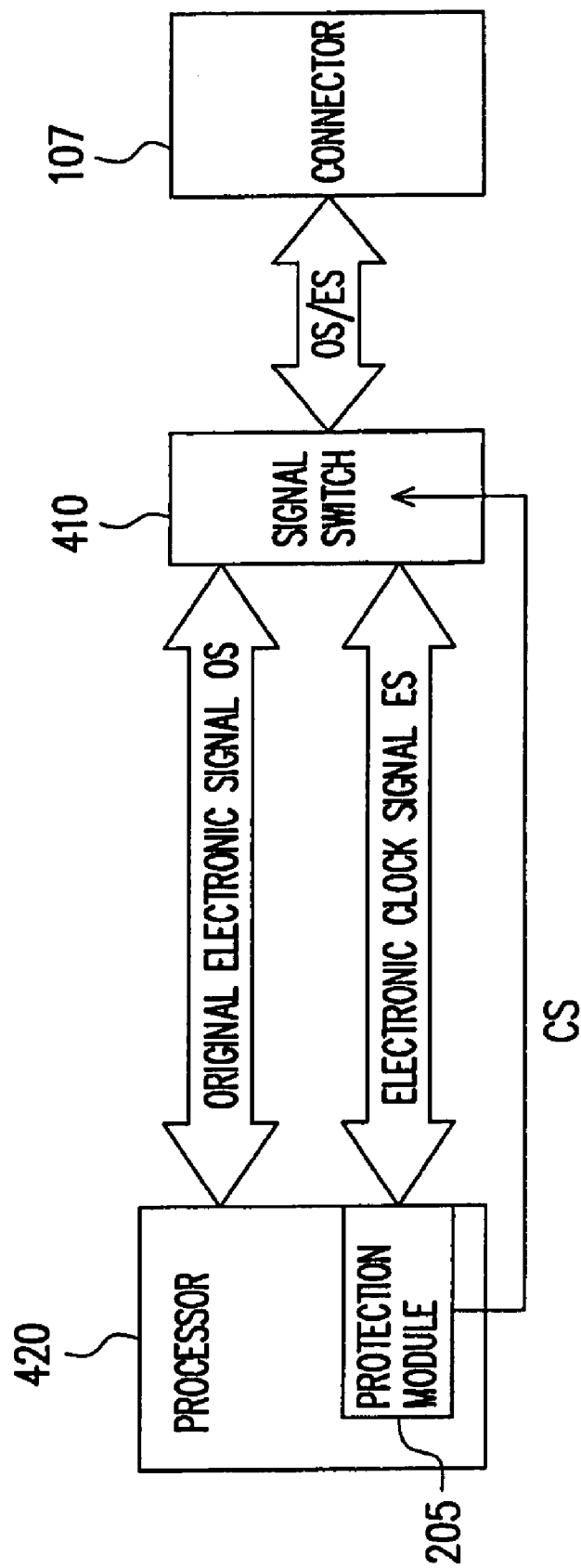
FIG. 5 illustrates the signal transmission pattern of the signal switch in FIG. 4.

The connector 107 of the protection system 100 may be implemented with the original connector of the display apparatus or by disposing a new connector, and data is transmitted between the electronic key (or the spare electronic key) and the display apparatus via the connector 107. Referring to FIG. 4, comparing to the protection system 100 in the first embodiment, a protection system 400 according to a third embodiment of the present invention further includes a signal switch 410. When the original connector of the display apparatus is used as the connector 107, the signal switch 410 receives an electronic signal from the display apparatus (referred to as original electronic signal OS) or an electronic signal from the protection system (referred to as electronic lock signal ES) through the connector 107. The display apparatus 403 switches the original electronic signal OS and the electronic lock signal ES by using the signal switch 410. The protection module 205 is implemented with the operation function of the processor 420 in the display apparatus 403. Referring to FIG. 5, when the display apparatus 403 works properly, the signal switch 410 switches to the original electronic signal OS and disables the protection module 205, and when the display apparatus 403 requires security identification, for example, at the first power on after the power supply is removed, the signal switch 410 switches to the electronic lock signal ES and enables the protection module 205 to identify the electronic key. The security identification of the electronic key has been described with reference to FIG. 2, and therefore will not be repeated again. The signal switch 410 switches to the original electronic signal after the security identification to display images OS. Certainly, data transmission of the signal switch 410 may also be controlled by the protection module 205. In other words, when the security identification is performed, the signal switch 410 may allow the transmission interface of the display apparatus 403 to communicate with the electronic key, and after the electronic key is removed, the original function of the transmission interface of the display apparatus 403 is recovered.

Figure 6:
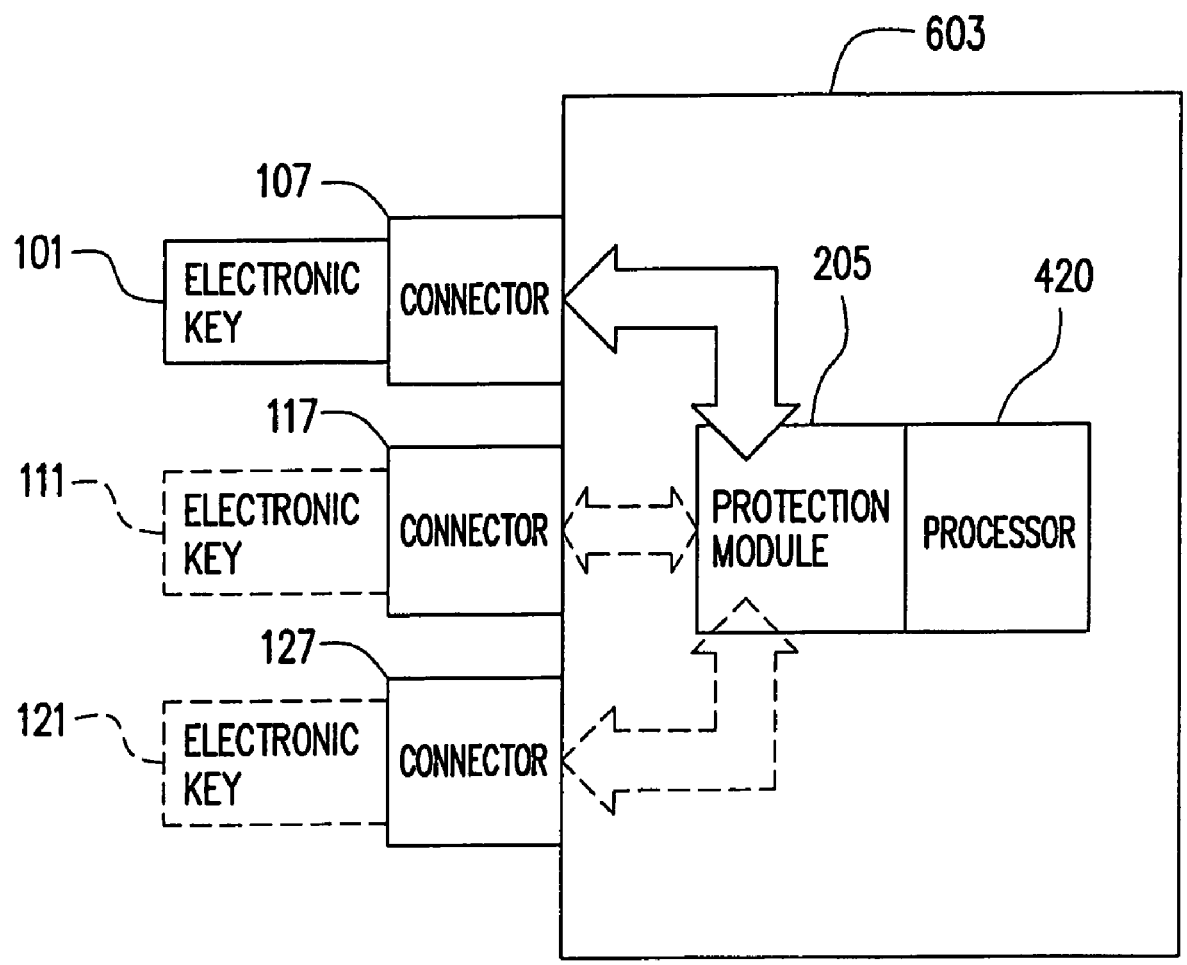
FIG. 6 illustrates the connection between an electronic key and a display apparatus according to a fourth embodiment of the present invention.

Referring to FIG. 6, comparing to the protection system 100 in the first embodiment, a protection system 600 according to a fourth embodiment of the present invention has different connectors used for transmitting data between an electronic key and a display apparatus. As shown in FIG. 6, the display apparatus 603 has connectors 107, 117 and 127 having different interfaces, and the electronic keys 101, 111, and 121 respectively support the transmission interfaces of the connectors 107, 117, and 127. When security identification is to be performed to the display apparatus 603, a user can use one of the electronic keys 101, 111, and 121 for the security identification. In the present embodiment, the electronic key 101 is used as an example. The protection module 205 obtains the first passwords in the electronic key 101 by controlling the signal switch, and the security identification procedure has been described with reference to FIGS. 1~5, and therefore will not be repeated again. The protection module 205 may also be expanded to any electronic apparatus which identifies a user through fingerprints, sound waves, or optical signals, so as to increase the security and convenience of the protection module 205.

In the present embodiment, the data (i.e. the passwords) in an electronic key may be longer than conventional passwords (for example, which may be up to 100 bits) and the user does not have to remember the passwords, thus, the security and convenience of such a protection system are enhanced. Moreover, the passwords in the electronic key can be encrypted and updated automatically when the passwords are identified as correct passwords. If wrong data is received, the security identification procedure is repeated until the passwords are correct; otherwise the display apparatus cannot be turned on. Thus, the display apparatus cannot be turned on properly even though the display apparatus is stolen, so that the security of the display apparatus is increased and the risk of the display apparatus being stolen is reduced.

Since the display apparatus updates the passwords in the electronic key right after the security identification procedure is completed, thus, the passwords in the electronic key are changed after every usage, so that even though the electronic key is copied, it is invalid and unusable because the passwords therein are not tallied with the identification codes in the display apparatus. If the copied electronic key is used first, the original electronic key becomes invalid, and the user can determine whether the electronic key had been used according to the validity of the original electronic key, accordingly the security of the display apparatus is increased.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A protection system for a display apparatus, comprising:
an electronic key, having a first memory for storing a plurality of first passwords;
a connector, disposed in the display apparatus and used for connecting the electronic key, wherein the connector is an original connector of the display apparatus, and the connector comprises a surface selected from a group consisting of a VGA interface, an RS232 interface, a DVI interface, a USB interface, and an HDMI interface;
a protection module, disposed in the display apparatus and having a second memory and a microprocessor, the second memory being used for storing a plurality of first identification codes, the plurality of first identification codes corresponding to the plurality of first passwords; and
a signal switch, coupled between the connector and the protection module, the signal switch being used for switching between an electronic signal of the display apparatus and an electronic signal of the protection system;
wherein when the electronic key is connected to the connector of the display apparatus, the signal switch receives the electronic signal of the electronic key through the connector and sends the electronic signal of the electronic key to the microprocessor and makes the protection module enable, such that the microprocessor of the protection module separately compares the plurality of first passwords and the plurality of first identification codes, if one of the plurality of first passwords tallies with one of the plurality of first identification codes, the display apparatus is allowed to be turned on and the microprocessor of the protection module separately updates the plurality of first passwords and the plurality of first identification codes, and the plurality of first passwords that have been updated correspond to the plurality of first identification codes that have been updated, and if none of the plurality of first passwords tallies with any of the plurality of first identification codes, the display apparatus is prohibited from being turned on,
wherein when the display apparatus is allowed to be turned on under a condition of that one of the plurality of first passwords tallies with one of the plurality of first identification codes, and the electronic key is removed from the connector of the display apparatus, the signal switch makes the protection module disable, such that the signal switch receives the electronic signal of the display apparatus through the connector and sends the electronic signal of the display apparatus to the microprocessor, and the microprocessor then processes the electronic signal of the display apparatus so as to make the display apparatus display images.

2. The protection system as claimed in claim 1, further comprising a spare electronic key, wherein the spare electronic key has a third memory for storing a plurality of second passwords, the second memory of the protection module comprises a plurality of second identification codes corresponding to the plurality of second passwords, and when the spare electronic key is connected to the connector of the display apparatus, the microprocessor of the protection module separately compares the plurality of second passwords with the plurality of second identification codes, and if one of the plurality of second passwords tallies with one of the plurality of second identification codes, the display apparatus is allowed to be turned on and then the microprocessor of the protection module separately updates the plurality of second passwords and the plurality of second identification codes, and the second passwords that have been updated correspond to the second identification codes that have been updated.

3. The protection system as claimed in claim 1, further comprising a wireless communication interface for connecting the electronic key.

4. A method for protecting a display apparatus coordinating with a protection system, the method comprising:
  storing, in a memory of a protection module disposed in the display apparatus, a plurality of first identification codes;
  switching, using a signal switch, between an electronic signal of the display apparatus and an electronic signal of an electronic key of the protection system;
  determining whether or not an electronic key of the protection system is connected to a connector of the display apparatus, wherein the connector is an original connector of the display apparatus, and the connector comprises a surface selected from a group consisting of a VGA interface, an RS232 interface, a DVI interface, a USB interface, and an HDMI interface;
  receiving, by the signal switch, an electronic signal of the electronic key of the protection system through the connector of the display apparatus and sending the electronic signal of the electronic key of the protection system to a microprocessor disposed in the display apparatus and making the protection module enable so as to separately compare, through the microprocessor, a plurality of first passwords in the electronic key of the protection system with the plurality of first identification codes when it is determined that the electronic key of the protection system is connected to the connector of the display apparatus, wherein if one of the plurality of first passwords tallies with one of the plurality of first identification codes, the display apparatus is allowed to be turned on and the plurality of first passwords and the plurality of first identification codes are then separately updated, and the plurality of first passwords that have been updated correspond to the plurality of first identification codes that have been updated, and if none of the plurality of first passwords tallies with any of the plurality of first identification code, the display apparatus is prohibited from being turned on; and
  receiving, by the signal switch, an electronic signal of the display apparatus through the connector of the display apparatus and sending the electronic signal of the display apparatus to the microprocessor and making the protection module disable so as to make the microprocessor process the electronic signal of the display apparatus and thereby enable the display apparatus display images when the electronic key of the protection system is removed from the connector of the display apparatus and the display apparatus is allowed to be turned on under a condition of that one of the plurality of first passwords tallies with one of the plurality of first identification codes.

5. The protection method as claimed in claim 4, further comprising:
  determining whether or not a spare electronic key of the protection system is connected to the connector of the display apparatus; and
  receiving the electronic signal of the spare electronic key of the protection system through the connector of the display apparatus and sending the electronic signal of the spare electronic key of the protection system to the microprocessor and making the protection module enable so as to separately compare a plurality of second passwords in the spare electronic key of the protection system with a plurality of second identification codes of the display apparatus when it is determined that the spare electronic key of the protection system is connected to the connector of the display apparatus, wherein if one of the plurality of second passwords tallies with one of the plurality of second identification codes, the display apparatus is allowed to be turned on.

6. The protection method as claimed in claim 5, wherein when comparing the plurality of second passwords with the plurality of second identification codes, if one of the plurality of second passwords tallies with one of the plurality of second identification codes, the plurality of second passwords and the plurality of second identification codes are separately updated, and the plurality of second passwords that have been updated correspond to the plurality of second identification codes that have been updated.

* * * * *